UNITED STATES PATENT OFFICE.

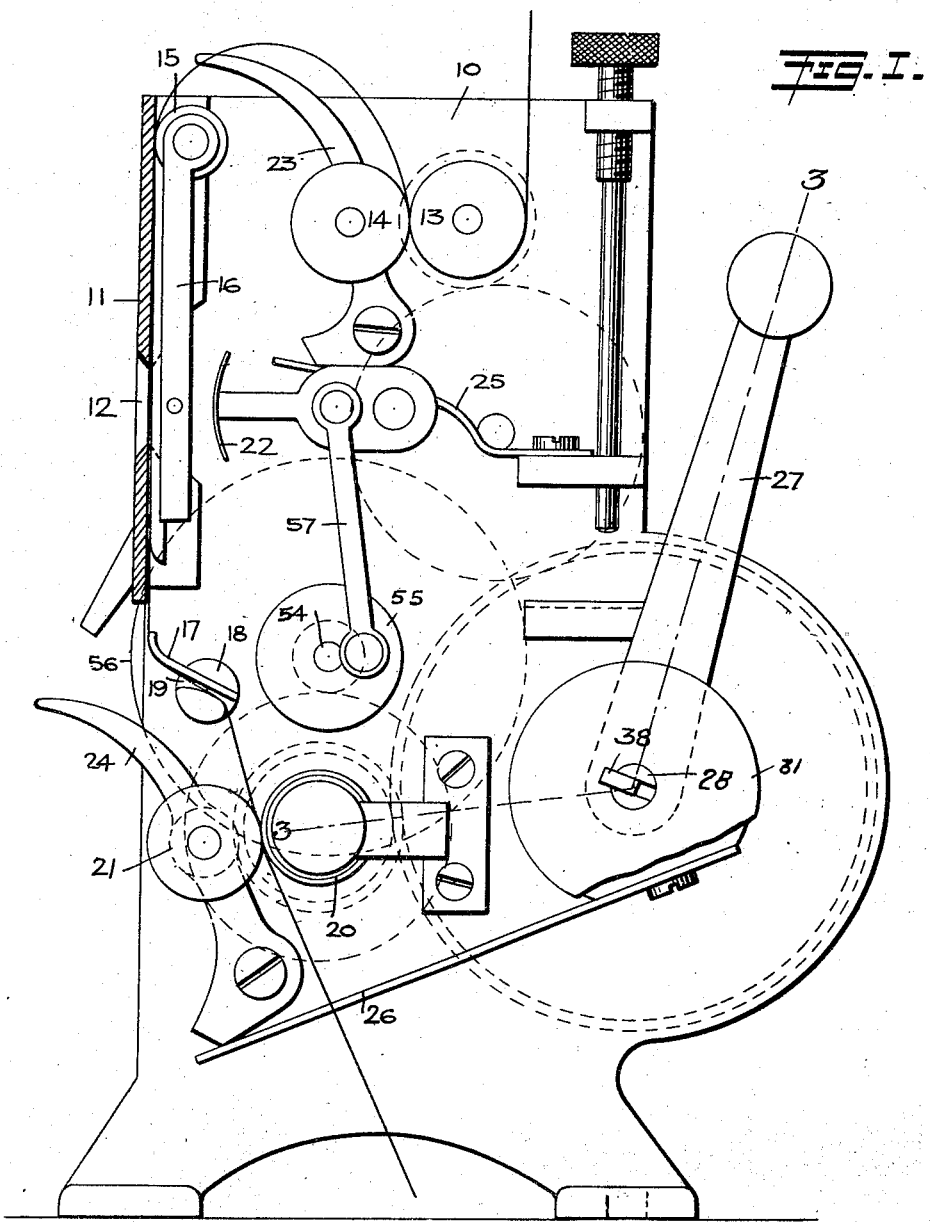

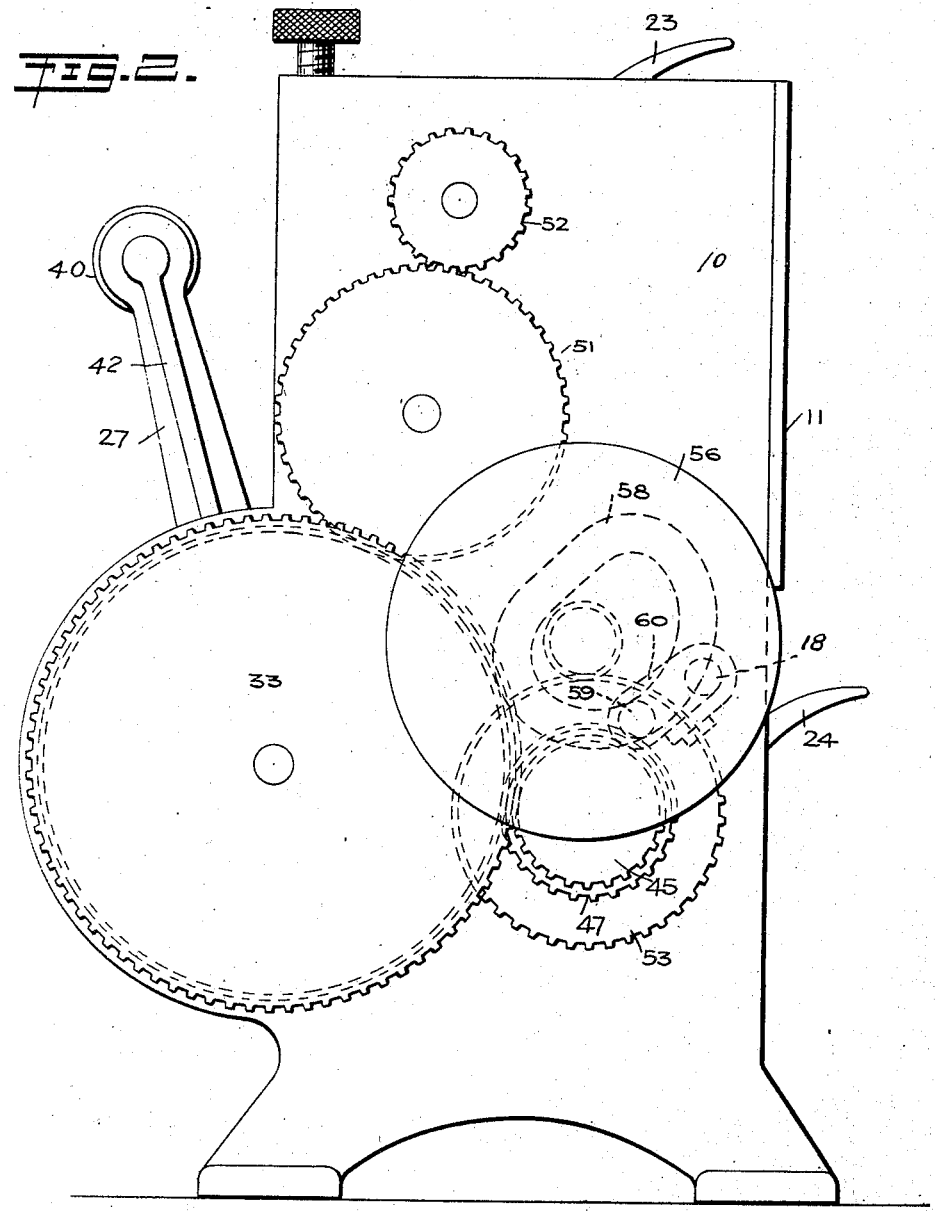

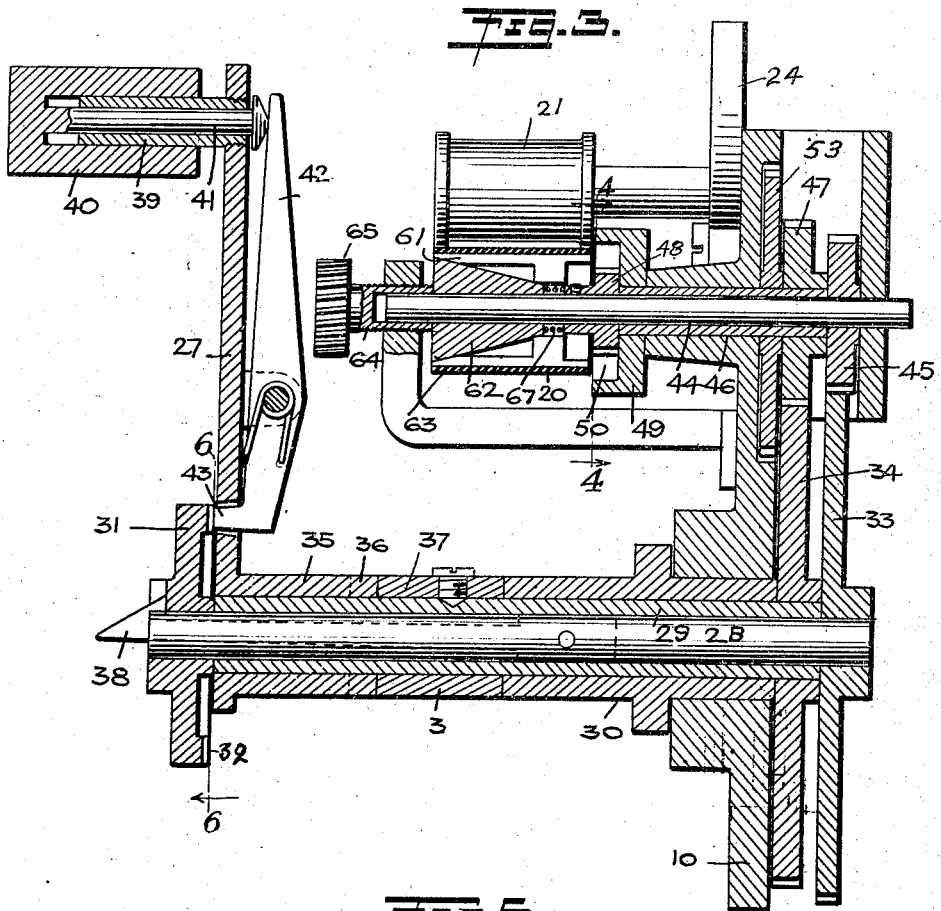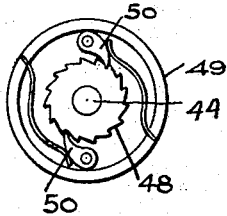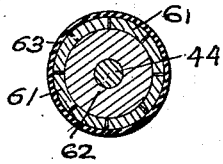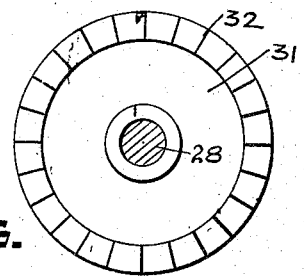

GEORGE W. BINGHAM, OF BROOKLYN, NEW YORK.

MOVING-PICTURE MACHINE.

1,129,328. Specification of Letters Patent. Patented Feb. 23, 1915.

Application filed April 29, 1912. Serial No. 693,787.

*To all whom it may concern:*

Be it known that I, GEORGE W. BINGHAM, a citizen of the United States, and resident of Brooklyn, in the county of Kings and State of New York, have invented certain new and useful Improvements in Moving-Picture Machines, of which the following is a specification.

In the ordinary forms of moving picture machines, whether they be cameras or projectors, it is customary to employ film advancing means having spurs, teeth, or other projections by which the said film advancing means engages with perforations along the edges of the film to insure the proper advancement of the film and the keeping of the pictures on the latter in registry with the exposure opening. After a film has been run through the projector a large number of times these perforations become enlarged or irregular by wear and the film becomes torn or cracked along the line of perforations so that there is more or less lost motion between the film and the film advancing means and it is no longer possible to obtain a steady picture. Such films eventually have to be discarded as valueless, irrespective of the initial cost of the film and even though the body portion is still perfect. In order to obviate this objection I have designed a machine in which the film advancing mechanism is devoid of teeth or projections and operates to properly advance the film irrespective of the presence or absence of perforations in the film and the condition of such perforations if they be present.

Various different mechanisms may be employed which will advance a predetermined length of film during each cycle of operation of the machine as for instance oscillating or reciprocating clamps, grippers, or beaters or rotary feed rollers. The difficulty with film advancing mechanisms of this kind which do not engage or register with perforations or the like on the film is due to the fact that the length of a strip of film having a definite number of pictures may vary due to uneven shrinkage during drying or the expansion or contraction of the film with variations in temperature or humidity conditions or from other causes. A shrinkage of one half inch in 100 ft. of film would not be noticeable in any one picture, but during the run of the film through the machine the picture would crawl half way down the screen. This difficulty is of course not encountered where the film advancing means engages with perforations in the film as the number of perforations per picture remains constant during the shrinking. In order to accommodate the machine to varying conditions of the film and also to permit the advancement of successive lengths of film exactly equal to the length of successive pictures I provide a film advancing means having a feed member capable of extremely fine adjustment to take care of shrinking or expansion and also capable of coarse adjustment to either frame the picture or accommodate the machine to pictures taken in different kinds of cameras and producing different numbers of exposures per unit length of film. For the fine adjustment I preferably employ a feed roller of such a character that its circumference may be varied in almost infinitesimal amounts. The feed roller is rotated through a predetermined angular distance or through a predetermined number of revolutions during each cycle of operation of the machine and thus the amount of film advanced during each cycle is dependent upon the amount of peripheral surface of the feed roller passing a given point. By expanding or contracting the feed roller the film may be fed faster or slower dependent upon whether it has expanded or contracted. To frame the picture without interfering with or interrupting the operation of the machine I provide means whereby the speed of rotation of the feed roller may be changed in respect to that of the operating crank so as to set the picture ahead and I control this means directly from the crank. Thus while the operator is turning the crank and finds that it is necessary to alter the position of the picture on the film in respect to the exposure opening, he may bring my improved mechanism into operation and properly frame the picture while continuing to turn the crank and with the same hand that turns the crank. This feature of my improved device is useful not only in taking care of faulty piecing together of film sections but also in adjusting the machine to receive films taken on a different kind of a camera and having a radically different number of pictures per unit length of film. By changing the speed of rotation of the feed roller in respect to the speed of rota tion of the crank and by changing the size of the speed roller, the machine may be adjusted to take a wide variety of films either with or without perforations, properly present them at the exposure opening, frame the picture and prevent crawling.

In the accompanying drawings I have illustrated only one embodiment of my invention but have not illustrated various details of the projecting machine which do not directly relate to the film advancing mechanism. It is evident that a wide variety of changes may be made in the arrangement of parts, details of construction and character of the mechanism shown for carrying out my invention, without departing from the spirit or scope thereof. In these drawings similar reference characters indicate corresponding parts in the several views.

Figure 1 is a side elevation of a machine constructed in accordance with my invention, a portion thereof being shown in section. Fig. 2 is an elevation of the opposite side of the machine. Fig. 3 is a transverse section on the line 3—3 of Fig. 1 and Figs. 4, 5 and 6 are sectional details on the lines 4—4, 5—5, and 6—6 respectively of Fig. 3.

My invention is equally applicable to cameras or projectors but it is especially useful in machines of the latter class.

The projecting machine which I have illustrated is one having a main frame or wall 10 supporting a front wall fore plate 11 with an exposure opening 12. The film comes from any suitable support, not shown, and passes first between a pair of feed rollers 13 and 14 and then over a roller 15. A gate 16 holds the film against the face plate 11 adjacent to the exposure opening and an oscillating leaf 17 carried by a slotted rock shaft 18 serves as a means for intermittently advancing the film past the opening. The rock shaft has a passage 19 therethrough constituting a guide for the film and a pair of feed rollers 20 and 21 serve to continuously deliver the film from the machine and prevent its return movement through the guide 19 during the operation of the intermittent film advancer 17. The upper and lower pairs of feed rollers are rotated continuously by suitable mechanism which also drives the intermittently operating film advancer and oscillates the shutter 22. The rollers 14 and 21 are not positively driven but are mounted on stub shafts carried by pivoted levers 23 and 24. Suitable springs 25 and 26 engage with these levers and resiliently hold the two rollers of each pair together so that the rollers 14 and 21 are rotated from frictional contact with the other rollers 13 and 20. These last mentioned rollers are positively driven upon the turning of a crank 27 and by a gearing which will be hereinafter pointed out.

The machine so far as I have described it in detail does not constitute any portion of my present invention as it follows in a general way the machine illustrated in prior United States Patent 983,021 granted January 3rd, 1911. I wish it to be understood that I have merely illustrated this machine as one type to which my invention may be applied and that I am not limited to any details of that machine or the combination of parts there disclosed except as defined in the claims hereinafter made.

As previously stated one important feature of my invention involves a mechanism whereby one or more of the feed rollers may be rotated at a plurality of different speeds in respect to the speed of rotation of the crank and in Fig. 3 I have illustrated the details of one mechanism which may be employed. This mechanism includes a shaft 28 concentric with a hollow shaft or sleeve 29 journaled in a bearing 30. The inner shaft 28 projects beyond the outer shaft 29 at both ends and one end carries a wheel 31 having ratchet teeth 32 on one face. At the opposite end, the inner shaft carries a large gear 33 closely adjacent to, and differing slightly in size from, a gear 34 carried on the adjacent end of the outer shaft 29. Adjacent to the ratchet wheel the outer shaft 29 carries the crank 27 previously referred to. Preferably the crank has a sleeve 35 which fits loosely on the hollow shaft 29 and the end of this sleeve is provided with teeth 36 for engaging in corresponding teeth on the end of a collar 37 rigidly fastened on the outer shaft. The collar and gear 34 may serve to hold the outer shaft against longitudinal movement in the bearing and the wheel 31 may serve to hold the sleeve 35 in place. I have illustrated a spring catch 38 within the shaft 28 and engaging with the outer side of the wheel 31 to retain the latter and prevent it from rotating in respect to the shaft 28. By pressing this catch diametrically the gear 31 may be loosened and removed and this will permit the removal of the crank 27. The crank carries a handle 39 at its outer end upon which there is a longitudinally movable grip 40. The grip carries a pin 41, the head of which projects through the crank into engagement with one end of a lever 42 pivoted on the crank and extending lengthwise thereof. The opposite end of the lever constitutes a dog 43 which projects through the crank toward the ratchet teeth 32. A spring normally holds the dog 43 out of engagement with the teeth 32 but by pushing endwise on the grip 40 of the handle the dog may be forced into engagement with said teeth so that the two shafts 28 and 29 can be compelled to rotate at the same speed. With the grip in its normal position the power is applied only to the outer shaft and the inner shaft is free.

The feed roller 20 is mounted on a shaft 44 which at one end has a gear 45 meshing with the gear 33. The shaft 44 is concentric with and mounted in an outer shaft 46 which carries a gear 47 meshing with the gear 34 on the outer shaft 29. Suitable means are provided whereby the rotation of the outer shaft 46 in one direction causes the rotation of the inner shaft 44 in the same direction but whereby the inner shaft may be rotated faster than the outer shaft if desired. This means may assume the form illustrated in Fig. 4 and may include a ratchet wheel 48 on the shaft 44 and a concentric wheel 49 having spring pressed dogs 50 engaging both the ratchet teeth. The operation of this portion of the mechanism is substantially as follows: With the parts in their normal position the dog 43 is out of engagement with the ratchet teeth 32 and the rotation of the crank serves to rotate the feed roller 20 through the gears 34 and 47 and through the spring pressed dogs 50. It will be noted that the two shafts 44 and 46 will now rotate together and that the shaft 28 will rotate at a slower rate than the shaft 29 due to the difference in size of the gears 33 and 34 and their intermeshing gears 45 and 47. When it is desired to advance the film at a faster rate of speed in order to frame the picture or because the pictures on the film are of greater length or for any other reason I may press endwise on the grip and thus lock the two shafts 28 and 29 together. Now the shaft 44 will be caused to rotate at a higher speed than the shaft 46 and the speed of the feed roller 20 will be increased by the slipping of the ratchet wheel 48 past the dogs 50. It will thus be seen that by turning the crank at a given speed the feed roller may be driven at any one of a plurality of different speeds. It is obvious that it would be a mere reversal and within the scope of my invention to make the normal position of the parts such that the film would travel at its higher speed and by moving the grip, bring gearing into operation which would reduce the speed of the feed roller rather than increase it as shown. It is also obvious that additional sets of gearing might be provided so as to give a third or even a fourth distinct speed for the feed roller. This could also be accomplished by replacing the gears 33 and 45 by different pairs which would give the feed roller the desired speed. If the machine be adjusted so that the slower speed of the feed roller produces the normal film advancement for each cycle of operations and the picture needs to be framed or properly positioned on the screen, the driving of the feed roller at the higher speed will make the picture crawl very rapidly until it reaches the desired position. The framing of the picture may thus be accomplished by the operator without necessitating interrupting the machine and without the removal of his hand from the crank. It is evident that other mechanisms would readily suggest themselves to those skilled in the art and by which the same results might be secured. I consider all such mechanisms as being within the scope of my invention which contemplates the normal advancement as well as the framing of the picture by the use of a single crank or other driving member. I have shown this feature of my invention applied only to the feed roller 20 but it is evident that two sets of gears may transmit the two different speeds to the feed roller 13 if desired. In practice this is not ordinarily necessary and I have shown only a single gear 51 meshing with the gear 34 and with a gear 52 upon the shaft of the roller 13 so as to drive the roller 13 at the same speed as the normal speed of the roller 20. There is a certain amount of slack film between the roller 13 and the exposure opening and it is of no consequence if this amount slightly increases or decreases during the run of a film. Preferably the roller 13 has a ratchet and dog drive so that the film and roller may be set ahead if there is too little slack. Also the film may slip between the first pair of rollers when it is being advanced at the higher speed by the second pair and there is no slack. The shaft 46 may have a gear 53 connected thereto and this may drive a pinion on a shaft 54 carrying a crank disk 55 and a fly wheel 56. The crank disk may be connected by a link 57 to the shutter 22 and the fly wheel may have a groove 58 receiving a pin or roller 59 on a link 60 on the rock shaft 18. Thus each revolution of the shaft 54 swings both the shutter and the oscillating film advancer through a complete cycle of operation in synchronism with the normal speed of the feed roller 20. This operating means for the shutter and oscillating film advancer constitutes no portion of my present invention as they are substantially identical with the construction shown in the prior United States Patent 983,021 above referred to.

With the arrangement of gearing above referred to it is possible to drive the film at different speeds in respect to the speed of the machine but this adjustment is comparatively coarse and cannot be used to take care of such slight differences as may be caused by shrinkage of the film. To take care of this I construct one or some of the feed rollers in such a manner that even though it be rotating at a constant speed it may operate to advance a slightly greater or less amount of film during each revolution. A preferred construction is one in which the feed roller 20 is expansible and contractible to present circumferences of greater or lesser length. Any suitable means may be employed for causing the expansion and contraction of the roller but preferably I construct it substantially as shown in Figs. 3 and 5. The body of the roller is made up of a plurality of sections 61 arranged around a cone 62 on the shaft 44. The sections and the cone are held against rotation in respect to the shaft and the sections are held together and covered by a thin sleeve 63 of rubber or other similar material. A screw 64 may be employed for forcing the cone lengthwise of the shaft to spread the sections apart and increase the circumference of the roller and a spring 67 may be employed for holding the cone against the screw. The rubber sleeve tends to contract the roller as the cone is permitted to move under the action of the spring. The large number of sections and the thickness of the sleeve 63 insure the presentation of a smooth peripheral surface at all times. The cone may be made very nearly cylindrical so as to require a considerable lengthwise movement to expand the roller to any appreciable extent or the said screw 64 may have a worm wheel 65 at its outer end for engagement with a worm and a delicate adjustment rendered possible in this manner. By an extremely slight variation in the size of the feed roller 20 the film can be kept in perfect registry even though it has shrunk only a very small fraction of an inch in its entire length. If the film varies at different points along this length the operator while turning the crank with one hand and ready for any change in the film which might require reframing can with the other hand slightly adjust the size of the feed roller should he notice the slightest crawl of the picture and before the crawl would be perceptible to the audience. The soft rubber face of the feed roller gives a good gripping surface which insures against any slipping of the film and the capability of both coarse and fine adjustment of the feeding means makes it possible to run any kind of film irrespective of its worn or shrunken condition and irrespective of the make of camera in which it was taken.

I have illustrated my expansible roll in a machine in which the roll rotates continuously and the intermittent advancement of the film past the exposure opening is accomplished by an oscillating member. It is of course evident that the expansible roll could be used to equally good purpose in various other types of machines and particularly that type in which the feed roller rotates intermittently instead of continuously, the extent of each rotation or partial rotation being sufficient to advance the film one picture length.

As previously pointed out my invention relates solely to the film feeding or advancing mechanism and is not limited to use in the particular machine illustrated or to the details of the mechanism shown.

Having thus described my invention what I claim as new and desire to secure by Letters Patent is:

1. In a moving picture machine the combination of an operating crank, a rotatable film advancing member, controllable means on said crank for varying the speed of said member and means for varying the size of said member.

2. A moving picture machine having a feed roller including a plurality of radially movable segments, a contractible sleeve encircling said segments, a cone movable lengthwise of said roller for spreading said segments apart, a spring within said roller, and tending to move said cone in one direction, and a screw at the opposite end of said cone for moving the latter in the opposite direction.

3. A moving picture machine having a feed roller including a plurality of radially movable segments, a contractible sleeve encircling said segments, a cone movable lengthwise of said roller for spreading said segments apart, a spring within said roller, and tending to move said cone in one direction to contract the roller, and a screw at the opposite end of said cone for moving the latter in the opposite direction to expand the cone.

Signed at New York city in the county of New York and State of New York this day of April, 1912.

GEORGE W. BINGHAM.

Witnesses:
C. W. FAIRBANK,
FLORENCE LEVIEN.